United States Patent [19]

Kretschmer

[11] 3,873,161
[45] Mar. 25, 1975

[54] FASTENING ARRANGEMENT FOR DECORATIVE WHEEL RINGS
[76] Inventor: Paul Kretschmer, Hoehenstr. 18, 8752 Waldaschaff, Germany
[22] Filed: Jan. 28, 1974
[21] Appl. No.: 437,473

Related U.S. Application Data
[63] Continuation of Ser. No. 284,283, Aug. 28, 1972, abandoned.

[52] U.S. Cl. .......... 301/37 P, 301/37 CD, 301/37 B
[51] Int. Cl. .............................................. B60b 7/04
[58] Field of Search ............ 301/37 B, 37 P, 37 CD

[56] References Cited
UNITED STATES PATENTS
2,174,087  9/1939  Horn ........................... 301/37 CD
3,181,915  5/1965  Spisak ............................ 301/37 B
3,601,449  8/1971  Buerger .......................... 301/37 P FOREIGN PATENTS OR APPLICATIONS
1,209,798  10/1970  United Kingdom .............. 301/37 P
7,024,310   6/1970  Germany ........................ 301/37 P Primary Examiner—M. Henson Wood, Jr.
Assistant Examiner—D. W. Keen
Attorney, Agent, or Firm—Harness, Dickey & Pierce

[57] ABSTRACT

A plurality of axial clip-receiving recesses are provided on an axial flange of a decorative wheel ring. A clip for fastening the ring to a vehicle wheel is axially interlocked in each recess. Each clip has a retaining finger resiliently supported for deflection toward its recess when the ring is applied to the vehicle wheel. Pointed teeth on the finger bite into the wheel.

14 Claims, 4 Drawing Figures

PATENTED MAR 25 1975

3,873,161

3,873,161

FASTENING ARRANGEMENT FOR DECORATIVE WHEEL RINGS

This is a continuation of application Ser. No. 284,283 filed Aug. 28, 1972 now abandoned.

This invention relates to a fastening arrangement for securing decorative wheel ring on a vehicle wheel.

Heretofore, in one type of fastening arrangement, fastening clips have been inserted within axial recesses on an axial flange of the decorative ring.

An object of the present invention is to improve this type of fastening arrangement by improving the assembly of clips into the recesses on the ring while at the same time facilitating installation on a vehicle wheel. Another object is to provide an improved clip, an improved assembly and an improved retention of the clip on the decorative wheel ring. A further object is to provide a fastening arrangement wherein the decorative ring can be readily applied to the vehicle wheel and when once applied, is securely retained on the wheel.

According to the disclosure, paired side walls are provided at intervals along an annular axial flange of the decorative wheel ring, with each pair of side walls joined by a top wall spaced radially of the annular flange and an end wall at the axially outer end of each pair of side walls. The interior portion of a fastening clip is axially interlocked in each recess defined by the aforementioned walls. An exterior portion of each clip protrudes through the open axially inner end of its recess and terminates in a retaining finger directed radially and axially outwardly. The finger includes teeth for biting engagement with an axial wheel flange when the ring is applied to the wheel. The finger is connected by means of a curved bend to the interior portion of the clip to provide flexing of the finger toward its recess when the ring is applied to the vehicle wheel.

The accompanying drawings illustrate a preferred embodiment of the invention.

Figure 1:
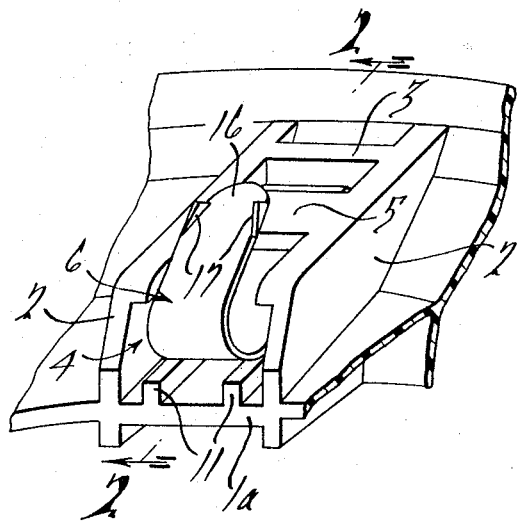
FIG. 1 is a fragmentary perspective view of a decorative ring embodying the fastening arrangement of the invention.
Figure 2:
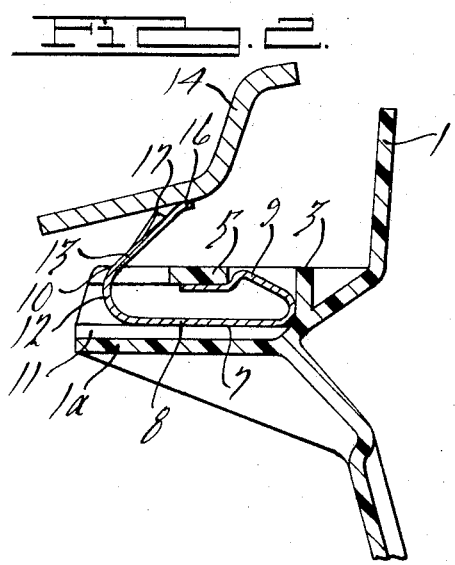
FIG. 2 is a vertical sectional view taken along line 2—2 in FIG. 1 and showing the orientation of the arrangement upon initial application of the ring to a vehicle wheel.
Figure 3:
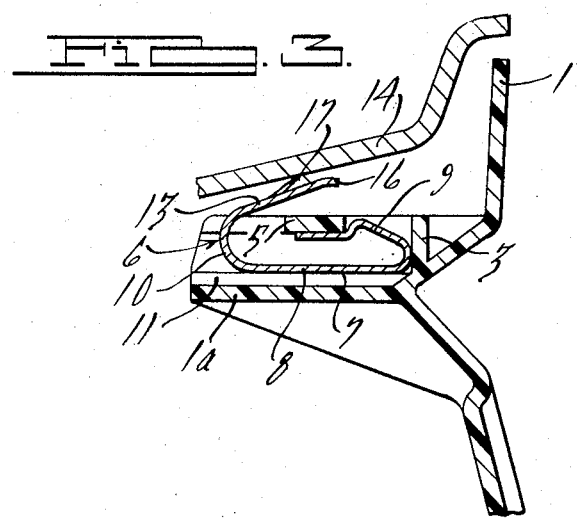
FIG. 3 is a view similar to FIG. 2 but showing the orientation when the ring is fully applied to the wheel.

In the embodiment of FIGS. 1, 2 and 3, a plastic decorative ring 1 is provided with an axial flange 1a. (It will be appreciated that ring 1 may either partially or fully cover the vehicle wheel to which it is applied and may be either circular or annular in shape.) A plurality of clip receiving recesses 4 are provided on the radially outer surface of flange 1a at intervals around ring 1. Each recess 4 is defined by a pair of circumferentially spaced side walls 2 which project radially and axially of flange 1a. The axially outer end of each recess 4 is defined by an end wall 3. A top wall 5 bridges side walls 2 in axially inwardly spaced relation to end wall 3 and in radially outwardly spaced relation to flange 1a. A pair of axial ribs 11 are fashioned on flange 1a within recess 4 and are spaced inwardly of side walls 2.

A fastening clip 6 is inserted within each recess 4. Each clip 6 comprises an interior portion 7 within its recess. Each interior portion 7 has a flat axial segment 8 lying against ribs 11 and a resilient detent 9 connected to the axially outer end of segment 8. Detent 9 is fashioned to protrude through and fit in the space between top wall 5 and end wall 3 to axially interlock clip 6 within recess 4. The free end of detent 9 bears against top wall 3 and the resiliency of the detent both urges segment 8 flat against ribs 11 while simultaneously forcing itself into the space between top wall 5 and end wall 3. Thus, each clip 6 is forcibly retained and axially interlocked on ring 1.

Each clip 6 further comprises an exterior portion 10 which extends exteriorly from the open axially inner end of its recess. Each exterior portion 10 comprises a curved bend 12, one end of which is connected to segment 8 and the other end of which is connected to a retaining finger 13. Finger 13 extends both radially and axially outwardly and terminates in an arcuate tab 16 which is bent out of the plane of finger 13 toward recess 4. A pair of circumferentially spaced, sharp pointed teeth 17 are formed on finger 13 inwardly of tab 16. The apexes of teeth 16 lie on an imaginary circle concentric with ring 1, and this circle lies radially inwardly of tab 16 when finger 13 is in its free state.

FIG. 2 shows the initial orientation of clip 6 upon application of ring 1 to a vehicle wheel 14. It will be seen that tab 16 is in contact with the annular axial wheel flange whereas teeth 17 are not. Now as ring 1 is moved axially inwardly, tab 16 wipes along the wheel flange to increasingly deflect finger 13 towards recess 4. As finger 13 is increasingly deflected, teeth 17 bite into the wheel flange and when ring 1 is fully applied as shown in FIG. 3, teeth 17 alone bite into the wheel flange to retain ring 1 on wheel 14.

It will be observed that since clip 6 is axially interlocked within recess 4, it will not move axially outwardly relative to flange 1a when ring 1 is applied to wheel 14. Thus, finger 13, and hence tab 16 and teeth 17, will be accurately positioned relative to wheel 14 and proper engagement with the axial wheel flange is always assured. Likewise, when ring 1 is removed, clip 6 can not be pulled out of its recess and hence, is always removed along with ring 1. The fastening arrangement provides relatively easy assembly of the ring 1 to wheel 14 and excellent retention of the ring on the wheel when assembled.

Figure 4:
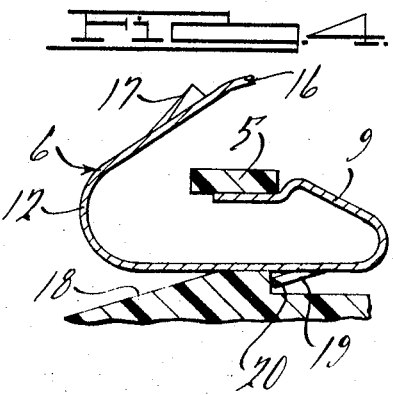
FIG. 4 is a view similar to FIG. 2 showing a modified embodiment.

FIG. 4 illustrates a slightly different arrangement for locking clip 6 in recess 4. Here a pair of locking tabs 19 are turned out of segment 8 and ribs 11 are replaced by inclined ramps 18 which terminate in shoulders 20 short of end wall 3. When clip 6 is inserted into recess 4, tabs 19 ride along ramp 18 thereby increasingly flexing detent 9. When the clip is fully inserted with tabs 19 positioned beyond shoulders 20, the detent relaxes to a certain extent thereby forcing tabs 19 into interlocking engagement behind shoulders 20.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. Fastening means for fastening a decorative wheel ring on the axially outer face of a vehicle wheel having an annular axial wheel flange, said fastening means comprising axial flange means on said ring adapted to lie radially inwardly of the axial wheel flange when the ring is applied to the wheel, means defining a plurality of clip-receiving recesses on said flange means around said ring, each of said recesses having an open axially inner end, a spring clip for each recess, each clip comprising an interior portion inserted into and axially interlocked with its recess and an exterior portion extending exteriorly of its recess from the open axially inner end thereof, each exterior portion comprising a retaining finger extending both axially and radially outwardly for engagement with the annular axial wheel flange, said finger including a pair of circumferentially spaced, sharp, pointed teeth projecting outwardly of the plane of the finger for biting engagement with the annular axial wheel flange, each clip including resilient means resiliently connecting its finger to the interior portion of its clip for enabling the finger to resiliently deflect toward its recess upon application of the ring to the wheel, each clip including between the teeth thereof a projecting tab which projects both radially and axially outwardly beyond the teeth thereof, each projecting tab being adapted, upon initial application of the ring to the wheel to initially engage the annular axial wheel flange prior to engagement of the teeth with said flange, each projecting tab disengaging said annular wheel flange as the teeth bite into said wheel flange upon full application of the ring to the wheel.

2. The fastening means of claim 1 wherein said tab is arcuate in shape.

3. The fastening means of claim 1 wherein said tab is turned out of the plane of its finger toward its recess.

4. The fastening means of claim 1 wherein each recess comprises an end wall means at the axially outer end thereof, axially extending wall means extending axially inwardly from said end wall means, and means defining an opening in said axially extending wall means, the interior portion of each clip comprising a flat axial segment bearing against said flange means and a generally C-shaped detent section extending from the axially outer end of said flat axial segment and interlocking with said opening in said axially extending wall means.

5. The fastening means of claim 4 wherein said C-shaped detent section also bears against said end wall means.

6. The fastening means of claim 5 wherein said axially extending wall means comprises a top wall spaced from said axial flange means, said opening in said axially extending wall means being provided in said top wall.

7. Fastening means for fastening a decorative wheel ring on the axially outer face of a vehicle wheel having an annular axial wheel flange, said fastening means comprising axial flange means on said ring adapted to lie radially inwardly of the axial wheel flange when the ring is applied to the wheel, means defining a plurality of clip-receiving recesses on said flange means around said ring, each of said recesses being defined by an end wall means at the axially outer end thereof and axially extending wall means extending axially inwardly from said end wall means, each recess being open at its axially inner end, said axially extending wall means comprising circumferentially spaced side wall means on said flange means and top wall means extending between said side wall means in radially spaced relation to said flange means, means defining an opening in said top wall means and a spring clip disposed within each of said recesses, each clip comprising an interior portion inserted into its recess and an exterior portion extending exteriorly of its recess from the open axial inner end thereof, each exterior portion comprising a retaining finger extending both axially and radially outwardly for engagement with the annular axial wheel flange, each interior portion comprising a resilient C-shaped detent section lodging within said opening in said top wall means and a flat axial section extending axially inwardly from said C-shaped detent section, said resilient C-shaped detent section urging said flat axial section against said flange means thereby providing an area contact of said flat section with said flange means.

8. The fastening means of claim 7 wherein said flange means comprises within each recess a pair of circumferentially spaced axially extending ribs, each clip having the flat axial section thereof bearing against and having area contact with said ribs.

9. The fastening means of claim 7 including on each clip an interlocking tab directed radially and axially inwardly from said flat axial section and including a shoulder on said flange means, said last-mentioned tab lodging behind said shoulder to axially interlock each clip with its recess.

10. The fastening means of claim 7 wherein each C-shaped detent section bears against the end wall means of its recess.

11. Fastening means for fastening a decorative wheel ring on the axially outer face of a vehicle wheel having an annular axial wheel flange, said fastening means comprising: axial flange means on said ring adapted to lie radially inwardly of the axial wheel flange when the ring is applied to the wheel; means defining a plurality of clip-receiving recesses on said flange means around said ring, each of said recesses being defined by an end wall means at the axially outer end thereof and axially extending wall means extending axially inwardly from said end wall means, each recess being open at its axially inner end, said axially extending wall means comprising circumferentially spaced side wall means on said flange means and top wall means extending between said side wall means in radially spaced relation to said flange means; and a spring clip means disposed within each of said recesses, each clip means comprising an interior portion inserted into its recess and an exterior portion extending exteriorly of its recess from the open axial inner end thereof, each exterior portion comprising retaining finger means extending both axially and radially outwardly for engagement with the annular axial wheel flange, each interior portion comprising resilient C-shaped detent section means lodging within its recess between said top wall means and said flange means and a flat axial section means extending axially inwardly from said C-shaped detent section means, said resilient C-shaped detent section means forcibly urging said flat axial section against said flange means thereby providing an area contact of said flat section with said flange means.

12. Fastening means for fastening a decorative wheel ring on the axially outer face of a vehicle wheel having an annular axial wheel flange, said fastening means comprising: axial flange means on said ring adapted to lie radially inwardly of the axial wheel flange when the ring is applied to the wheel; axially extending wall means disposed in radially spaced relation to said axial flange means whereby a recess is provided between said axial flange means and said wall means, said recess being open at the axially inner end thereof; a spring clip means disposed within said recess, said spring clip means comprising an interior portion within said recess and an exterior portion extending exteriorly of said recess from the open axially inner end thereof, said interior portion comprising axial section means disposed against said flange means and resilient C-shaped section means connected to the axially inner end of said axial section means, said resilient C-shaped section means being deformed from its free shape between said axial flange means and said axial wall means to urge said axial section means against said axial flange means; said exterior portion comprising a retainer finger means extending both axially and radially outwardly of the recess for engagement with the annular axial wheel flange and bearing against said axial flange means to urge said axial section means against said axial flange means upon application of the wheel ring to the wheel; and a radial surface means on said ring cooperatively associated with said clip means for axially limiting the insertion of said interior portion of said clip means into said recess when said ring is applied to the wheel.

13. A spring clip means for fastening a decorative wheel ring on an annular axial flange of a vehicle wheel and adapted to lodge within a recess on the wheel ring defined between an axially extending flange means and an axially extending wall means, said recess being open at the axially inner end thereof to receive said spring clip means, said recess being spaced radially inwardly of the annular axial wheel flange, said spring clip means comprising: an interior portion adapted for insertion within said recess and an exterior portion adapted to extend exteriorly of said recess from the open axially inner end thereof when the spring clip means is inserted into said recess; said interior portion comprising axial section means adapted to be disposed against said flange means and resilient C-shaped section means connected to the axially inner end of said axial section means, said resilient C-shaped section means being adapted to be deformed from its free shape when lodged between said axial flange means and said axial wall means to thereby forcibly urge said axial section means against said axial flange means; said exterior portion comprising a retainer finger means adapted to extend both axially and radially outwardly of the recess for engagement with the annular axial wheel flange and to bear against said axial flange means to urge said axial section means against said axial flange means upon application of the wheel ring to the wheel.

14. Fastening means for fastening a decorative wheel ring on the axially outer face of a vehicle wheel having an annular axial wheel flange, said fastening means comprising axial flange means on said ring adapted to lie radially inwardly of the axial wheel flange when the ring is applied to the wheel, axially extending wall means disposed in radially spaced relation to said axial flange means whereby a recess is provided between said axial flange means and said wall means, said recess being open at the axially inner end thereof, a spring clip means disposed in said recess, said clip means comprising an interior portion inserted into said recess and an exterior portion extending exteriorly of said recess from the open axially inner end thereof, said exterior portion comprising a retaining finger extending both axially and radially outwardly for engagement with the annular axial wheel flange, said finger including a pair of circumferentially spaced, sharp, pointed teeth projecting outwardly of the plane of the finger for biting engagement with the annular axial wheel flange, said clip including resilient means resiliently connecting said finger to said interior portion for enabling the finger to resiliently deflect toward said recess upon application of the ring to the wheel, said finger including between the teeth thereof a projecting tab means which projects both radially and axially outwardly beyond the teeth thereof, said projecting tab means being adapted, upon initial application of the ring to the wheel to initially engage the annular axial wheel flange prior to engagement of the teeth with the annular axial wheel flange, said projecting tab means disengaging the annular axial wheel flange as the teeth bite into said wheel flange upon full application of the ring to the wheel.

* * * * *